April 13, 1965     J. ROSÁN     3,177,916

SELF-ALIGNING TWO-PART THREADED FASTENER UNIT

Filed Feb. 20, 1963

INVENTOR.
José Rosán
BY
ATTORNEY

United States Patent Office 3,177,916
Patented Apr. 13, 1965

3,177,916
SELF-ALIGNING TWO-PART THREADED
FASTENER UNIT
José Rosán, San Juan Capistrano, Calif., assignor to
Rosan Engineering Corp., Newport Beach, Calif., a corporation of California
Filed Feb. 20, 1963, Ser. No. 261,937
2 Claims. (Cl. 151—41.73)

This invention relates to fasteners and, more particularly, to a self-aligning two-part threaded fastener unit adapted to secure various elements to workpieces in which the self-aligning two-part threaded fastener unit is mounted.

This application is a continuation-in-part of application for U.S. Letters Patent, Serial No. 785,035, filed January 5, 1959, and now abandoned, entitled "Self-Aligning Two-Part Threaded Fastener Unit."

To facilitate the consideration of the invention and the disclosure of the construction and mode of operation thereof, the self-aligning two-part threaded unit will be referred to hereinafter as a floating fastener.

Conventional floating fasteners are characteristically composed of two elements, namely, a body member which is adapted to be secured to the associated workpiece and a fastener component mounted in said member. Conventionally, the fastener component is mounted in apertures in the body member and is adapted to move relatively thereto to permit self-alignment of the fastener component in the body member. In the past, the body members have usually been fabricated from sheet metal incorporating apertures adapted to receive corresponding tongues on the fastener component and the body member has usually been crimped or folded to cause the apertures to be bent into proximity to the tongues and to encompass the same.

It is, therefore, an object of my invention to provide a floating fastener which is characterized by the elimination of the conventional sheet metal body member and which incorporates a body member machined from solid stock or formed by casting or other methods. Alternatively, the body member can be formed from a tubular piece of sheet metal which is formed by stamping or other processes as a unitary structure.

Because of the elimination of the conventional sheet metal body member, the tendency of the mounting tongues on the fastener component to be released from the apertures in the body member is eliminated because of the greater wall thickness and rigidity of the body member characteristic of the construction of the floating fastener of the present invention.

Another object of my invention is the provision of a self-aligning fastener which includes a cylindrical body member having opposed, mounting tongue receiving apertures therein and whose bore is slightly less than the axial dimension of the tongues across the fastener component to be installed in said body member, whereby the fastener can be installed in operative relationship with the apertures in the body member by the mere expedient of slightly tilting the fastener to cock the tongues so that they may be readily received in the opposed apertures and, whereby the wall of the body member immediately above said apertures may be compressed radially inwardly to form flats thereupon and reduce the diameter of said body member sufficiently to prevent the extraction of the tongues from the corresponding apertures in said body member.

Other objects and advantages of the invention will be apparent from the following specification and the accompanying drawing, which is for the purpose of illustration only, and in which.

Figure 1:
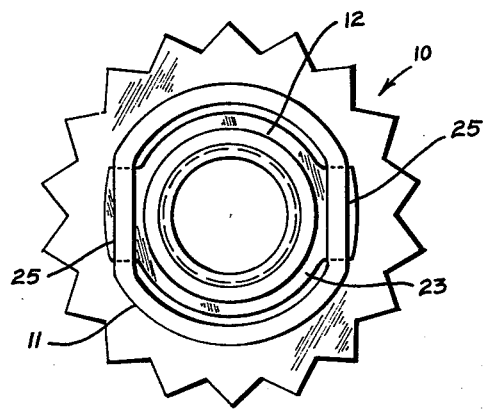
FIG. 1 is a top plan view of a floating fastener unit constituting one embodiment of the invention.
Figure 4:
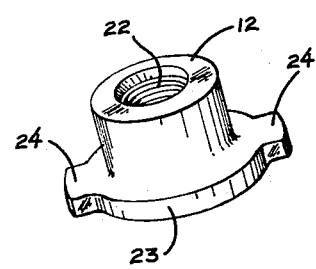
FIG. 4 is a perspective view of the fastener component of the floating fastener.
Figure 2:
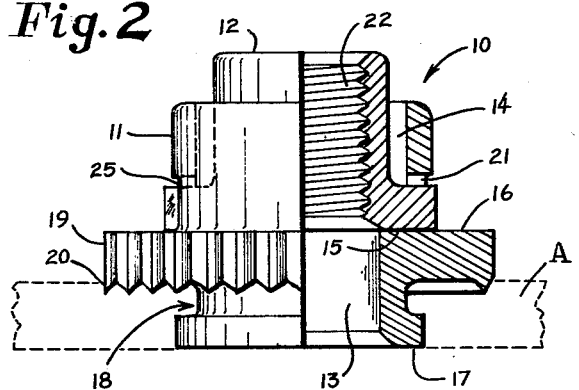
FIG. 2 is a partly sectional view of the floating fastener of FIG. 1.

Referring to the drawing, and particularly to FIGS. 1–4, I show an embodiment of the invention constituted by a floating fastener 10, said fastener including a generally cylindrical body member 11 and a substantially cylindrical fastener component 12 which is connected to the body member 11 for movement relative thereto in a manner which will be described in greater detail below.

The body member 11 is of generally tubular configuration and incorporates a bore 13 and a counterbore 14 formed in a cylindrical wall portion thereof. The intersection between the bore 13 and the counterbore 14 defines an annular seat 15 for the fastener component 12.

The body member 11 incorporates an annular abutment flange 16 and a pilot flange 17 of lesser diameter than the abutment flange 16 to define a radial recess or groove 18, the peripheral portion of the flange 16 being provided with serrations 19 having sharpened extremities constituting teeth 20. The construction of the abutment flange 16, pilot flange 17, recess or groove 18 and teeth 20 constitute the subject matter of my co-pending application, Serial No. 860,015, filed December 16, 1959, entitled "Sheet Metal Fasteners" and constitute no part of the present invention, serving merely as a means for affixing the floating fastener 10 in operative relationship with a workpiece A.

It will, of course, be obvious to those skilled in the art that the body member 11 may be provided with alternative structural forms which will permit it to be affixed in operative relationship with a sheet metal support, such as a flange having ears incorporating openings adapted to receive rivets serving as a means of affixation to the workpiece and it is, of course, not intended that the teachings of the invention be limited to the specific type of means of affixation incorporated in the body member 11.

The fastener component 12 is of generally tubular configuration and incorporates a threaded bore 22 which may or may not be a through bore. The lower extremity of the fastener component 12 is constituted by a generally annular flange 23 adapted to seat on the annular seat 15 of the body member 11 and incorporates two tongues or radial mounting extensions 24 which are diametrically opposed to each other.

The diameter of the flange 23 of the fastener component 12 is slightly less than the diameter of the counterbore 14 of the body member 11. Therefore, when the fastener component 12 is installed in operative relationship with the body member 11, in a manner to be described in greater detail below, lateral shifting of the fastener component 12 within the counterbore 14 of the body member 11 is permitted to achieve self-alignment of the fastener component 12 in a horizontal plane.

Formed in the wall of the counterbore 14 of the body member 11 and extending therethrough are diametrically opposed, substantially rectangular apertures 21 which are adapted to receiev the mounting tongues 24 on the flange 23 of the fastener component 12.

Figure 3:
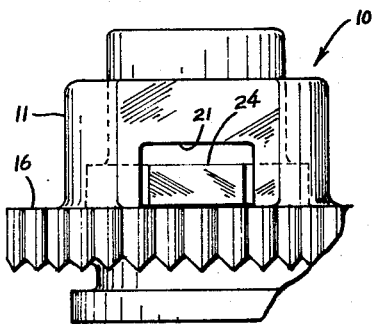
FIG. 3 is a side elevational view of the floating fastener of FIG. 1 rotated 90° from the view of FIG. 2.

The tongues 24, as best shown in FIG. 3 of the drawing, are of substantially rectangular cross section and are of less height and width than the corresponding apertures 21 in the wall of the counterbore 14 of the body member 11. Therefore, as will be readily apparent to one skilled in the art, the fastener component 12 is adapted to shift both in a horizontal plane to permit movement of the fastener component 12 within the counterbore 14 and is also adapted to rotate slightly about a longitudinal axis extending through the flange 23 and the tongues 24 to permit angular displacement of the fastener component 12 within the counterbore 14.

As previously indicated, the wall of the counterbore is initially cylindrical in horizontal cross section and the diametrical length of the flange 23 across the tongues 24 is slightly greater than the diameter of the counterbore 14 of the body member 11. To install the fastener component 12 in operative relationship with the apertures 21 formed in the wall of the counterbore 14 of the body member 11, it is merely necessary to slightly tilt the fastener component 12 until one of the tongues 24 is engaged in a corresponding aperture 21. The one tongue can then be pushed to its full limit through the corresponding aperture 21 to locate the opposed tongue 24 in proximity to the corresponding aperture 21 which can then be engaged by the remaining tongue 24.

After the tongues have been disposed in the apertures 21, the cylindrical wall of the body member 11 is deformed inwardly to form flats 25 upon the cylindrical wall immediately above the apertures 21. Therefore, the tongues 24 are permanently restrained against removal from the apertures 21.

By providing a floating fastener 10 incorporating a body member which is provided with a cylindrical wall of the character of that disclosed adapted to mount and receive the tongues of the fastener component 12, the extensive forming operations entailed in the manufacture of conventional sheet metal body members in conventional floating fasteners are eliminated. In addition, the inherent rigidity and hoop strength of the cylindrical body member greatly enhance the capability of retaining the fastener component 12 in operative relationship with the body member 11.

Figure 5:
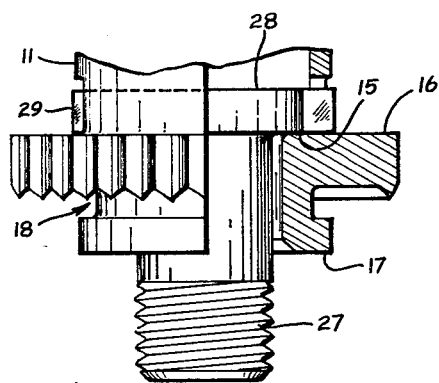
FIG. 5 is a fragmentary sectional view of an alternative embodiment of the floating fastener of the invention.
Figure 6:
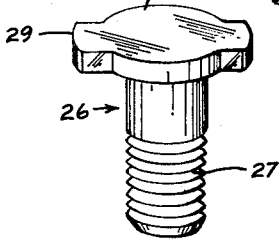
FIG. 6 is a perspective view of the fastener component of the floating fastener of FIG. 5.

Shown in FIGS. 5 and 6 of the drawing is an alternative embodiment of the floating fastener of the invention which incorporates a body member 11 identical with that incorporated in the floating fastener 10 previously described hereinabove. However, instead of being provided with a fastener component incorporating a threaded bore, the fastener component of the alternative embodiment is constituted by a screw component 26 which is provided with a cylindrical shank incorporating a threaded portion 27 and provided with an integral flange 28 incorporating opposed mounting tongues 29 of the same general configuration as the flange 23 and tongues 24 of the previously described embodiment of the invention.

The tongues 29 are of slightly greater diametrical length across the flange 28 than the internal diameter of the counterbore of the body member 11 and are installed in operative relationship with the corresponding apertures 21 in the cylindrical wall of the counterbore of the body member 11 in the same manner as the tongues 24 of the flange 23 of the previously discussed floating fastener 10. When the fastener component 26 has been installed in operative relationship with the tongues 29 thereof located in the apertures 21 formed in the cylindrical wall of the counterbore 14, the cylindrical wall of the counterbore 14 is deformed radially inwardly to reduce the diameter of the counterbore 14 over the apertures 21 and thus prevent withdrawal of the tongues 29 from operative relationship with said apertures.

Characteristically, the reduced diameter of the flanges 23 and 28 of the two embodiments of the self-aligning fastener components and the reduced dimensions of the tongues 24 and 29 on said flanges, respectively, permit both lateral and rotary movement of the fastener components mounted in operative relationship with the body member 11. Moreover, the greatly enhanced rigidity achieved by the tubular configuration of the body member 11 eliminates the possibility that the walls of the body member 11 may be sprung, as in the case of conventional sheet metal body members, to release the fastener components from operative relationship with the body member 11 when the fastener components are subjected to excessive loads.

I thus provide, by my invention, a floating fastener which is characterized by its simplicity of construction and ease of assembly, and which is further characterized by its resistance to the separation of the associated fastener components from the body member which serves as a mounting means therefor.

I claim:

1. A two-part self-aligning fastener, the combination comprising:

a first body, said first body being tubular and having an internal annular shoulder, said body provided with integral means for mounting said first body in a workpiece and for preventing rotation of said first body, said first body having a tubular portion extending upwardly away from said shoulder, said tubular portion having diametrically opposed apertures extending therethrough adjacent said annular shoulder, said tubular portion being deformed inwardly to provide diametrically opposed flat areas extending longitudinally upwardly from and circumferentially coextensive with said apertures; a cylindrical second body, said second body being within said first body and seated upon said internal annular shoulder carried by said first body so as to axially extend into said upwardly extending tubular portion of said first body, said second body being provided with diametrically opposed outwardly extending projections interfitting within said apertures carried by said tubular portion, said projections having a diametrical length thereacross greater than the internal diameter of said tubular body and at least equal to the transverse distance from the internal surface of one flat area to the external surface of the opposite flat area, said outwardly extending projections having a longitudinal dimension slightly less than the longitudinal dimension of the apertures whereby very limited tilting movement and axial displacement of said second body are permitted, and said second body having an internally threaded bore which receives a fastener threaded therein.

2. A two-part self-aligning fastener, the combination comprising: a first body, said first body being tubular and having an internal annular shoulder, said body provided with integral means for mounting said body in a workpiece and for preventing rotation of said first body, said first body having a tubular portion extending upwardly away from said shoulder, said tubular portion having diametrically opposed apertures extending therethrough adjacent said annular shoulder, said body portion being deformed inwardly to provide diametrically opposed flat areas extending longitudinally upwardly from and circumferentially coextensive with said apertures; a cylindrical second body, said second body being within said first body and seated upon said internal annular shoulder carried by said first body, said second body being provided with diametrically oppose outwardly extending projections interfitting within said apertures carried by said first body, said projections having a diametrical length thereacross greater than the internal diameter of said tubular body and at least equal to the transverse distance from the external surface of one flat area to the external surface of the opposite flat area, said outwardly extending projections having a longitudinal dimension slightly less than the longitudinal dimesion of the apertures whereby very limited tilting movement and axial displacement of said second body are permitted, and said second body having an externally threaded portion which axially extends through the mounting means carried by said first body and in a direciton away from said upwardly extending portion of said first body.

References Cited by the Examiner

UNITED STATES PATENTS

| | | | |
|---|---|---|---|
| 2,243,923 | 6/41 | Swanstrom | 151—41.76 |
| 2,605,806 | 8/52 | Tinnerman | 151—41.75 |
| 2,634,934 | 4/53 | Martin et al. | 151—41.73 |
| 2,782,827 | 2/57 | Rosan | 151—41.73 |
| 2,827,097 | 3/58 | Nuss | 151—41.73 |

FOREIGN PATENTS 1,178,030    12/58    France.

EDWARD C. ALLEN, *Primary Examiner.*